US011171783B2

(12) United States Patent
Doddavula et al.

(10) Patent No.: US 11,171,783 B2
(45) Date of Patent: Nov. 9, 2021

(54) SYSTEM AND METHOD FOR DECENTRALIZED IDENTITY MANAGEMENT, AUTHENTICATION AND AUTHORIZATION OF APPLICATIONS

(71) Applicant: Infosys Limited, Bangalore (IN)

(72) Inventors: Shyam Kumar Doddavula, Bangalore (IN); Brijesh Balakrishnan, Mangalore (IN)

(73) Assignee: INFOSYS LIMITED, Bangalore (IN)

( * ) Notice: Subject to any disclaimer, the term of this patent is extended or adjusted under 35 U.S.C. 154(b) by 182 days.

(21) Appl. No.: 16/582,188

(22) Filed: Sep. 25, 2019

(65) Prior Publication Data
US 2020/0106610 A1   Apr. 2, 2020

(30) Foreign Application Priority Data

Sep. 28, 2018  (IN) .............................. 201841036827

(51) Int. Cl.
| | | |
|---|---|---|
| *H04L 29/06* | (2006.01) | |
| *H04L 9/32* | (2006.01) | |
| *H04L 9/06* | (2006.01) | |

(52) U.S. Cl.
CPC .......... *H04L 9/3213* (2013.01); *H04L 9/0637* (2013.01); *H04L 9/3297* (2013.01)

(58) Field of Classification Search
CPC ... H04L 9/3213; H04L 9/3297; H04L 9/0637; H04L 63/10; H04L 63/12; H04L 2209/38; H04L 2209/805; H04L 9/3239; H04L 9/321; H04L 63/08

See application file for complete search history.

(56) References Cited

U.S. PATENT DOCUMENTS

| | | | | |
|---|---|---|---|---|
| 9,558,493 | B2* | 1/2017 | Carrott ............... | G06Q 20/3829 |
| 10,142,107 | B2* | 11/2018 | Frei ....................... | H04L 9/0825 |
| 2012/0131090 | A1* | 5/2012 | Doddavula ............. | G06F 16/27 |
| | | | | 709/203 |
| 2014/0108801 | A1* | 4/2014 | McBride ............. | H04W 12/065 |
| | | | | 713/168 |
| 2014/0315518 | A1* | 10/2014 | Engelhart ......... | H04W 12/0431 |
| | | | | 455/411 |

(Continued)

OTHER PUBLICATIONS

Search Report for UK Patent Application No. 1913969.0, dated May 12, 2020.

*Primary Examiner* — Eleni A Shiferaw
*Assistant Examiner* — Hassan A Hussein
(74) *Attorney, Agent, or Firm* — Troutman Pepper Hamilton Sanders LLP

(57) ABSTRACT

A method, a system and/or an apparatus for decentralized identity management, authentication and authorization of applications is disclosed. The method, system and/or apparatus enables a machine/application to identify any other machine/application in a network without requiring a central server or authority. The method, system and/or apparatus involves controlling the data access and communication between machine/applications in a blockchain network by authorizing the communication only when there exists authorization permissions. The authorization permission of application/machine and user are stored in distributed ledger only if quorum is achieved as per the consensus algorithm present in the smart contract defined by the admin, making the system more secure.

24 Claims, 10 Drawing Sheets

(56) References Cited

U.S. PATENT DOCUMENTS

| | | | | |
|---|---|---|---|---|
| 2014/0380427 A1* | 12/2014 | Srinivasan | ............. | H04L 63/08 |
| | | | | 726/4 |
| 2015/0082025 A1* | 3/2015 | Deshpande | ........... | H04L 63/062 |
| | | | | 713/155 |
| 2017/0180128 A1* | 6/2017 | Lu | .......................... | H04L 9/321 |
| 2017/0338967 A1* | 11/2017 | Lewison | ................ | H04L 9/321 |
| 2018/0062858 A1* | 3/2018 | Xu | ......................... | H04L 63/12 |
| 2018/0191714 A1* | 7/2018 | Jentzsch | .............. | H04L 63/126 |
| 2018/0248880 A1* | 8/2018 | Sardesai | ............... | H04L 9/3239 |
| 2018/0331835 A1* | 11/2018 | Jackson | ................ | H04L 9/3247 |
| 2019/0245699 A1* | 8/2019 | Irwan | ................... | H04L 9/3268 |
| 2019/0372786 A1* | 12/2019 | Ra | ....................... | H04W 12/084 |
| 2020/0067907 A1* | 2/2020 | Avetisov | ............. | H04L 9/0825 |
| 2020/0162468 A1* | 5/2020 | Faist | .................... | G06F 21/604 |
| 2020/0162908 A1* | 5/2020 | Kim | ................... | H04L 63/0853 |

\* cited by examiner

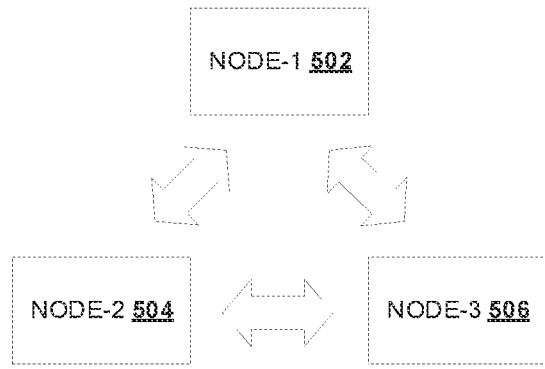
FIGURE 5A - CONSENSUS QUORUM
| PREMISSIONS | NODE | VOTE |
|---|---|---|
| APP 1 (402) -> APP 2 (432) | NODE 1 (502) | YES |
| APP 1 (402) -> APP 2 (432) | NODE 2 (504) | YES |
| APP 1 (402) -> APP 2 (432) | NODE 3 (506) | YES |
FIGURE 5B - PERMISSIONS REQUEST LEDGER
| FROM - APP | TO - APP |
|---|---|
| APP 1 (402) | APP 2 (432) |
FIGURE 5C - APPROVED PERMISSIONS LEDGER

SYSTEM AND METHOD FOR DECENTRALIZED IDENTITY MANAGEMENT, AUTHENTICATION AND AUTHORIZATION OF APPLICATIONS This application claims the benefit of Indian Patent Application Serial No. 201841036827 filed Sep. 28, 2018, which is hereby incorporated by reference in its entirety.

FIELD

The field generally relates distributed ledger technology. In particular, the present technique relates to a method and/or a system for decentralized identity management, authentication and authorization of applications.

BACKGROUND

In the current scenario, the world is being flooded with too many devices, applications (apps) and people are using it in connected environment over internet. Internet of Things (IoT) is transforming several businesses and the way people live with solutions like connected cars, connected homes, smart cities and so on. Analysts are predicting that billions of devices will be connected to the internet and over 40 percent of several enterprises are facing increasing cyber security threats today. Increasing adoption of IoT devices is resulting in increase of threat with more potential attacks on device to device communications. When the world is connected with digital applications and devices, it is very crucial to determine the identity and authenticity of the communication, digital applications or devices. When a device sends a message to another device for a service, the receiving device needs to authenticate and authorize the request without requiring human intervention. There are several challenges in implementing authentication and authorization service for machine to machine communications like scalability to support potentially millions of devices, prevention of replay attacks, performance of authentication and authorization requests so as to not slow down machine to machine interactions, fault tolerance and availability of the authentication and authorization services, ability to withstand Distributed Denial-of-Service (DDoS) attacks, malicious insider attacks and so on.

Authentication and authorization of machine to machine communication is required for various scenarios like in IoT driven connected products, in service oriented enterprise applications, in application integration contexts and so on. In enterprise information systems context, employees use different Information Technology (IT) systems for performing their tasks like travel system, attendance system, performance management system, project management system and so on. There is a need for these systems to interact with each other to get any relevant information. Enterprise applications are increasingly being developed with micro-services based architecture. Micro-service architecture is an architectural style that structures an application as a collection of loosely coupled services, which implements business capabilities. The micro-services need to communicate with each other on behalf of a user to get the user's relevant data. For ex: A leave micro service may have to interact with a travel micro service to retrieve information about when an employee was on official travel. This poses two challenges—the travel micro service, first needs to ensure that the request has originated from the leave micro service and not from an attacker trying to steal employee information and secondly has to ensure that the user has authorized this exchange of data. With increasing regulatory requirements like General Data Protection Regulation (GDPR) that require the users to control their sensitive data, enterprise applications need to be designed to address these requirements. Also since applications are being developed through composition of services which could potentially be developed and hosted by partners across organizational boundaries, it becomes imperative that the service interactions implement authentication and authorization controls. In IoT driven connected products like a connected car, there is a need for components on the car to interact with each other and also with the cloud services.

There are several existing solutions like OAuth (Open Authorization) which address above mentioned requirements but there are several limitations because of which they are not useful in certain contexts. Most of them require a central authentication server which may not be feasible in systems that are designed to be de-centralized. Several of these authentication mechanisms use user-name/passwords which can be hacked easily. Some of them use bio-metrics for authentication but they lead to privacy concerns and also introduce a huge risk with stolen bio-metrics data as it is impossible to replace them once stolen.

Hence, there is a need for a solution to overcome the above mentioned problems.

SUMMARY

Disclosed are a method, a system and/or a non-transitory computer readable storage medium for decentralized identity management, authentication and authorization of applications.

In one aspect, a method for decentralized identity management, authentication and authorization of applications is disclosed. The method involves storing public keys and one or more authorization permissions of a first application and a second application in one or more registries of one or more distributed ledger nodes in a blockchain network through at least one of the one or more authorization servers, based on consensus algorithm present in a smart contract. The storing may cause the public keys to be published among the one or more distributed ledger nodes through approval wherein the approval is provided based on predefined consensus in the smart contract of the blockchain network.

The second application receives a request from the first application. The request from the first application may be, to receive data from the second application. The request comprises an authorization token generated by a client associated with the first application. To generate the authorization token, the client associated with the first application may receive a request from the first application to communicate with the second application. The client may further send a request to an authorization server of the first application to determine one or more authorization permissions of the first application. The client may generate an authorization token comprising token data, if at least one of the one or more authorization permissions is a grant permission. The client may then send the generated authorization token to the first application by encrypting the authorization token with private key of the first application. Further, the generated authorization token may be stored in the one or more distributed ledger nodes based on the smart contract. The authorization token may comprise token data which is at least one of, but not limited to a nonce, a token expiry time and/or a usage flag.

After receiving the request from the first application, the second application validates the authorization token of the first application using a client associated with the second application. The validation may be performed by the client associated with the second application by retrieving a public key of the first application and a token data from a distributed ledger node associated with an authorization server of the second application, and verifying the authorization token and token data. The second application authorizes the request of the first application based on the validation. Further, the second application may deny the request of the first application if the authorization token is invalid.

In another aspect, a system for decentralized identity management, authentication and authorization of applications is disclosed. The system comprises a blockchain network, one or more distributed ledger nodes, one or more authorization servers, and one or more processors. The one or more processors may be configured to store public keys and one or more authorization permissions of a first application and a second application in one or more registries of the one or more distributed ledger nodes in the blockchain network through at least one of the one or more authorization servers, based on consensus algorithm present in a smart contract. The storing may cause the public keys to be published among the one or more distributed ledger nodes through approval wherein the approval is provided based on predefined consensus in the smart contract of the blockchain network.

The second application receives a request from the first application. The request from the first application may be, to receive data from the second application. The request comprises an authorization token generated by a client associated with the first application. To generate the authorization token, the client associated with the first application may receive a request from the first application to communicate with the second application. The client may further send a request to an authorization server of the first application to determine one or more authorization permissions of the first application. The client may generate an authorization token comprising token data, if at least one of the one or more authorization permissions is a grant permission. The client may then send the generated authorization token to the first application by encrypting the authorization token with private key of the first application. Further, the generated authorization token may be stored in the one or more distributed ledger nodes based on the smart contract. The authorization token may comprise token data which is at least one of, but not limited to a nonce, a token expiry time and/or a usage flag.

After receiving the request from the first application, the second application validates the authorization token of the first application using a client associated with the second application. The validation may be performed by the client associated with the second application by retrieving a public key of the first application and a token data from a distributed ledger node associated with an authorization server of the second application, and verifying the authorization token and token data. The second application authorizes the request of the first application based on the validation. Further, the second application may deny the request of the first application if the authorization token is invalid.

In yet another aspect, a non-transitory computer readable storage medium for decentralized identity management, authentication and authorization of applications is disclosed. The computer readable storage medium stores computer executable instructions to execute one or more steps, comprising, storing public keys and one or more authorization permissions of a first application and a second application in one or more registries of one or more distributed ledger nodes in a blockchain network through at least one of the one or more authorization servers, based on consensus algorithm present in a smart contract. The storing may cause the public keys to be published among the one or more distributed ledger nodes through approval wherein the approval is provided based on predefined consensus in the smart contract of the blockchain network.

The second application receives a request from the first application. The request from the first application may be, to receive data from the second application. The request comprises an authorization token generated by a client associated with the first application. To generate the authorization token, the client associated with the first application may receive a request from the first application to communicate with the second application. The client may further send a request to an authorization server of the first application to determine one or more authorization permissions of the first application. The client may generate an authorization token comprising token data, if at least one of the one or more authorization permissions is a grant permission. The client may then send the generated authorization token to the first application by encrypting the authorization token with private key of the first application. Further, the generated authorization token may be stored in the one or more distributed ledger nodes based on the smart contract. The authorization token may comprise token data which is at least one of, but not limited to a nonce, a token expiry time and/or a usage flag.

After receiving the request from the first application, the second application validates the authorization token of the first application using a client associated with the second application. The validation may be performed by the client associated with the second application by retrieving a public key of the first application and a token data from a distributed ledger node associated with an authorization server of the second application, and verifying the authorization token and token data. The second application authorizes the request of the first application based on the validation. Further, the second application may deny the request of the first application if the authorization token is invalid.

The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5A is a sample arrangement of nodes to reach consensus, according to one or more embodiments.

FIG. 5B is a table illustrating permissions request ledger, according to one or more embodiments.

FIG. 5C is a table illustrating approved permissions ledger, according to one or more embodiments.

Figure 1:
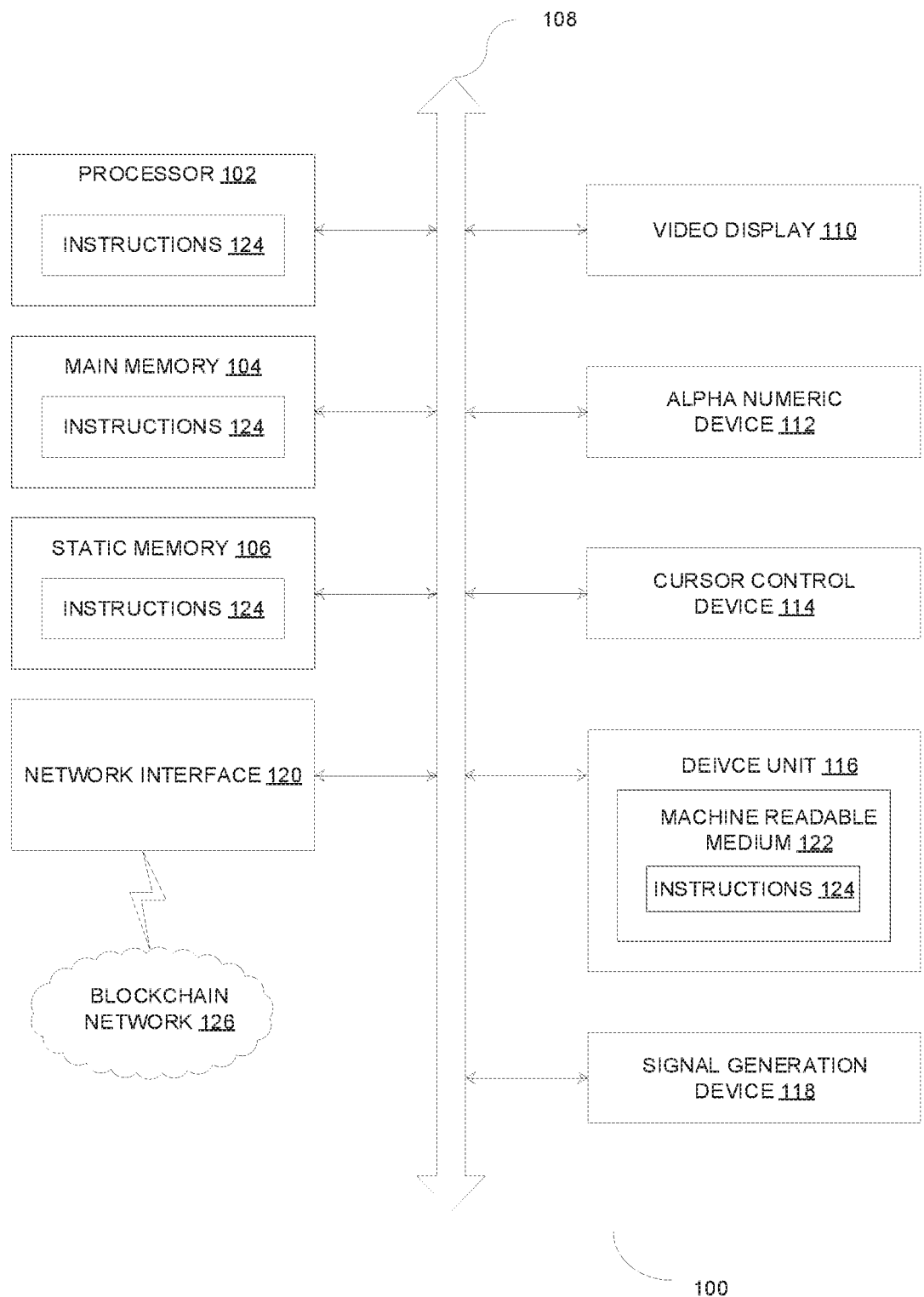
FIG. 1 is a diagrammatic representation of a data processing system capable of processing a set of instructions to perform any one or more of the methodologies herein, according to one or more embodiments.

Other features of the present embodiments will be apparent from the accompanying drawings and from the detailed description that follows.

DETAILED DESCRIPTION

The present disclosure enables autonomous device to device communications there by providing foundational capabilities needed to build IoT based connected products and services. The present disclosure also enables secure communication between applications in an enterprise network (e.g. intranet).

Example embodiments, as described below, may be used to provide a method, a system and a non-transitory computer readable storage medium for decentralized identity management, authentication and authorization of applications. Although the present embodiments have been described with reference to specific exemplary embodiments, it will be evident that various modifications and changes may be made to these embodiments without departing from the broader spirit and scope of the various embodiments.

Exemplary embodiments of the present disclosure provide a method, a system and/or a non-transitory computer readable storage medium for decentralized identity management, authentication and authorization of applications. The method may involve storing public keys and one or more authorization permissions of a first application and a second application in one or more registries in one or more distributed ledger nodes through at least one of the one or more authorization servers, based on consensus algorithm present in a smart contract. The storing may cause the public keys to be published among the one or more distributed ledger nodes through approval wherein the approval is provided based on predefined consensus in the smart contract of blockchain network.

The second application may receive a request from the first application. The request from the first application may be, to receive data from the second application. The request may comprise an authorization token generated by a client associated with the first application. To generate the authorization token, the client associated with the first application may receive a request from the first application to communicate with the second application. The client may further send a request to an authorization server of the first application to determine one or more authorization permissions of the first application. The client may generate an authorization token comprising token data, if at least one of the one or more authorization permissions is a grant permission. The client may then send the generated authorization token to the first application by encrypting the authorization token with private key of the first application. Further, the generated authorization token may be stored in the one or more distributed ledger nodes based on the smart contract. The authorization token may comprise token data which is at least one of, but not limited to a nonce, a token expiry time and/or a usage flag.

After receiving the request from the first application, the second application may validate the authorization token of the first application using a client associated with the second application. The validation may be performed by the client associated with the second application by retrieving a public key of the first application and a token data from a distributed ledger node associated with an authorization server of the second application, and verifying the authorization token and token data. The second application may authorize the request of the first application based on the validation. Further, the second application may deny the request of the first application if the authorization token is invalid.

In one or more embodiments, Distributed ledger technology is a consensus of replicated, shared, and synchronized digital data geographically spread across multiple sites, countries, or institutions. A peer-to-peer network as well as consensus algorithms are required to ensure replication across nodes is undertaken. One form of distributed ledger design is the blockchain system, which can be either public or private.

Smart contracts are self-executing contracts with the terms of the agreement between distributed ledger nodes written into lines of code. The code and the agreements contained therein exist across a distributed, decentralized blockchain network.

FIG. 1 is a diagrammatic representation of a data processing device capable of processing a set of instructions to perform any one or more of the methodologies herein, according to one embodiment. FIG. 1 shows a diagrammatic representation of machine and/or the data processing device in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal—computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a blockchain network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
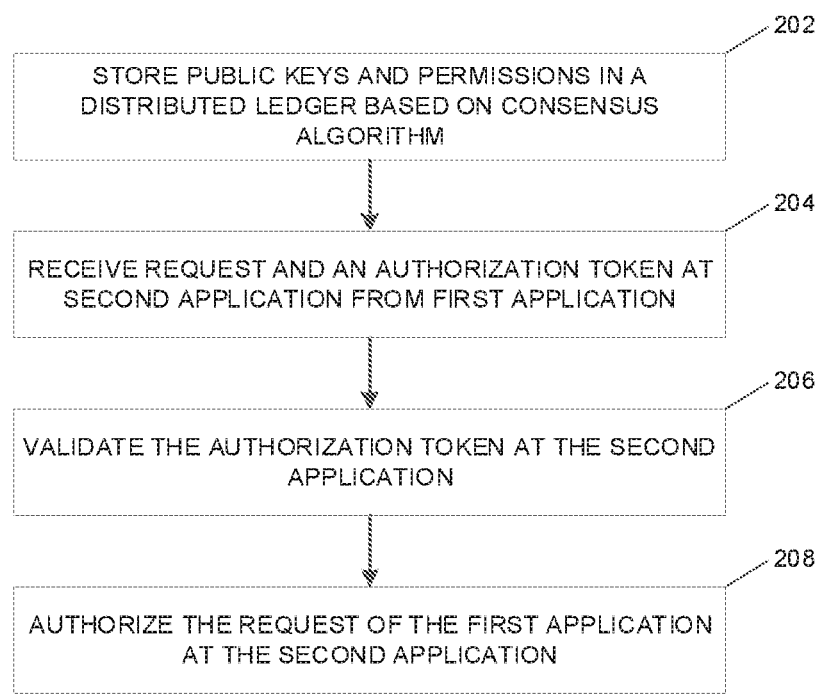
FIG. 2 is a process flow diagram illustrating decentralized identity management, authentication and authorization of applications, according to one or more embodiments.

FIG. 2 is a process flow diagram illustrating decentralized identity management, authentication and authorization of applications, according to one or more embodiments.

There may exist a situation wherein an application (say 'first application') wants to communicate with another application (say 'second application') in a pool of applications connected over a network. Each of the applications shall be identified with an identifier. The identifier may be unique for each of the applications, which can be easily validated by other applications and may also enable non-repudiation.

When first application sends request to the second application, the second application may need to ensure the identity and authenticity of the first application and a user associated with the first application. The second application may need to ensure the authenticity and integrity of the request. The second application may also need to ensure that only such data which is permitted by the user is shared from the second application to the first application. The method/system should also enable the user to control what data to be shared between applications.

In one or more embodiments, each of the applications may be connected to a dedicated server called authentication server, through a client. The application may also be installed on client devices. The client devices may be any computing system, but not limited to a computer, a mobile device, an IoT device or any other device that is capable of sending and receiving signals over a computer network. Each of the applications may be communicatively coupled to a dedicated authentication server through their clients.

Initially, the applications may have to onboard or register themselves in a blockchain network. In the present embodiment, the first application may generate an identifier. The identifier may be a public-private key pair. The public-private key pair may be generated by using one or more algorithms, but not limited to RSA (Rivest-Shamir-Adleman) algorithm, DSA (Digital Signature Algorithm), ECDSA (Elliptical Curve Digital Signature Algorithm), EdDSA (Edwards-curve Digital Signature Algorithm) and/or Ed25519 algorithm. Similarly, the second application may also generated a public-private key pair. The private key of the first application may be stored in a key store of the client associated with the first application. The client associated with the first application may publish the public key of the first application through an authentication server associated with the first application. The authentication server associated with the first application may be connected to a distributed ledger node in the blockchain network. The authentication server may make an entry of the public key of the first application in the distributed ledger node based on smart contract.

Similarly, the private key of the second application may be stored in the key store of the client associated with the second application. The client associated with the second application may publish the public key of the second application through an authentication server associated with the second application. The authentication server associated with the second application may be connected to another distributed ledger node in the blockchain network. The authentication server may make an entry of the public key of the second application in the ledger of another distributed ledger node based on smart contract. The steps to make an entry in the distributed ledger nodes is discussed in subsequent paragraphs of the present disclosure.

In one or more embodiments, when the applications register themselves, they may create authorization policies for the communication with other applications. The authorization policies, also referred as authorization permission may be a set of rules that to be followed for communication between applications. For example, the first application may create authorization permissions for communication, such as, but not limited to, the first application is allowed to communicate with the second application, the first application is allowed to send request to a third application, the first application can receive request from another application, and so on. The authorization permissions may be stored in the distributed ledger node associated with the authorization server of the first application, by entering the authorization permissions in the distributed ledger node connected over the blockchain network.

In one or more embodiments, the second application may create authorization permissions for communication with applications, such as, but not limited to, the second application is allowed to communicate with the first application, the second application is allowed to send request to a third application, the second application can receive request from another application, and so on. The authorization permissions may be stored in the distributed ledger node associated with the authorization server of the second application, by entering the authorization permissions in the distributed ledger node connected over the blockchain network.

In one or more embodiments, the public keys and the authorization policies may be stored in a distributed ledger nodes based on consensus algorithm, as in step 202. The steps to store data (public keys and/or authorization policies) in distributed ledger nodes is described in subsequent paragraphs. When the first application needs to communicate with the second application, the first application may send a request to the client associated with it, to generate an authorization token. The client associated with the first application may receive a request from the first application for the authorization token. The client associated with the first application may send a request to the authorization server of the first application to determine one or more authorization permissions of the first application. The one or more authorization permissions may be at least one of a grant permission or a deny permission. If the authorization permission allows the communication with the second application, say the authorization policy contains an entry indicating that the communication with the second application can be made, i.e. at least one of the one or more authorization permission related to communication of the first application and the second application is determined to be a grant permission, the authorization server may send the response to the client of the first application that the authorization permission is a grant permission. Post receiving the response from the authorization server, the client associated with the first application may generate an authorization token. The authorization token may be generated using at least one of, but not limited to UUID (Universally Unique Identifier) and/or GUID (Globally Unique Identifier). The generated authorization token may comprise a token data, which may be at least one of, but not limited to a nonce, a token expiry time or a usage flag.

In one or more embodiments, the nonce is an arbitrary number that can be used just once. It is often a random or pseudo-random number issued in an authentication protocol to ensure that old communications cannot be reused in replay attacks. The token expiry time may be used to set the time by which the receiving application/device must use the data. The usage flag may be used to indicate that a receiving application to mark the authorization token as 'used' so that the same authorization token may not be used for second time, hence avoiding replay attacks. The client associated with the first application may then encrypt the generated authorization token with the private key of the first application, and may send the encrypted authorization token to the first application. The authorization token may be encrypted with the private key of the first application using one or more algorithms, such as, but not limited to RSA (Rivest-Shamir-Adleman) algorithm, DSA (Digital Signature Algorithm), ECDSA (Elliptical Curve Digital Signature Algorithm), EdDSA (Edwards-curve Digital Signature Algorithm) and/or Ed25519 algorithm. In one or more embodiments, the generated/encrypted authorization token may be stored in the distributed ledger node based on the consensus algorithm present in the smart contract.

In one or more embodiments, if the authorization server may determine that at least one of the one or more authorization permissions related to communication of the first application the second application is a deny permission, the authorization server may send response to the client that the communication may not be allowed. If the response from the authorization server is a deny permission, the client associated with the first application may not generate the authorization token and may deny the request of the first application.

If the first application receives an authorization token from the client associated with the first application, the first application may send a request comprising the authorization token to the second application, requesting data from the second application. The second application may receive the request and the authorization token, as in step 204.

In one or more embodiments, the second application may validate the authorization token using the client associated with the second application, as in step 206. To validate the authorization token, the client associated with the second application may retrieve the public key of the first application and the token data from the distributed ledger node associated with the authorization server of the second application. The client associated with the second application may then validate the authorization token by verifying the encryption of the authorization token and verifying the token data.

In one or more embodiments, then verification of the authorization token may involve decrypting the authorization token using the public key of the first application retrieved from the distributed leger node through authorization server of the second application. If the decryption is successful, then the token data may be validated. In one or more embodiments, the token data may be validated. The validation may comprise checking the presence of nonce, determining whether the authorization token is accessed within the token expiry time and/or determining the state of usage flag. The second application may authorize the request of the first application if the authorization token is determined to be valid based on the validation performed by the client associated with the second application as in step 208, and may send the requested data to the first application. In one or more embodiments, the validation of the authorization token fails, then the second application may reject the request of the first application. For example, if the time has passed the token expiry time and/or the usage flag is determined to be 'used' already, the request from the first application is denied.

In one or more embodiments, at the time of generating the authorization token, the client associated with the first application, through the authorization sever, may determine whether the first application is authorized to have access to intended data of a user from the second application, wherein these type of permissions are stored as a part of one or more authorization permissions in the distributed ledger nodes. In another embodiment, the check of whether first application is authorized to access to the intended data of a user may also be performed by the second application at the time of validation of the authorization token received from the first application.

Figure 3:
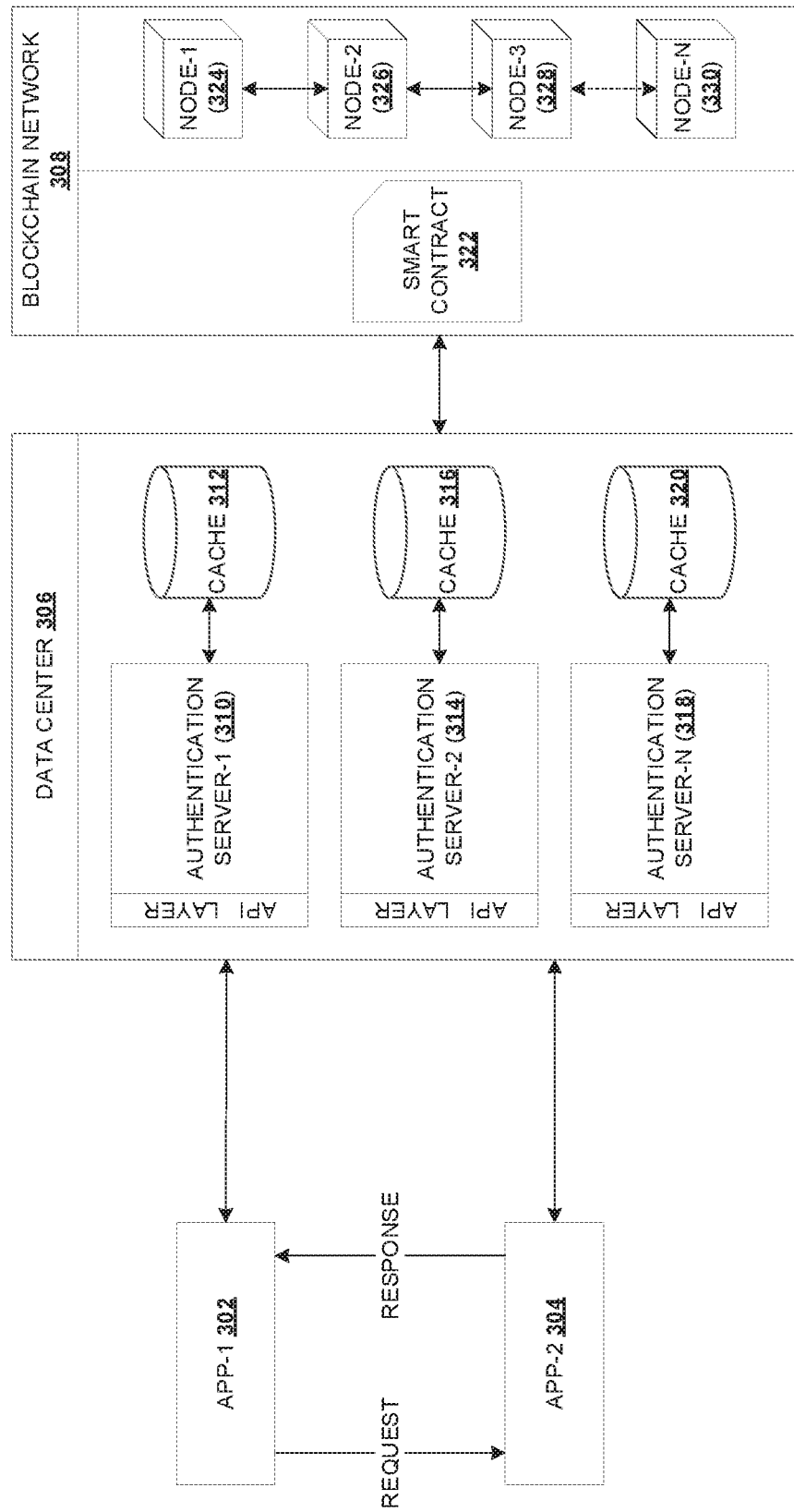
FIG. 3 is an architecture diagram illustrating a system for decentralized identity management, authentication and authorization of applications, according to one or more embodiments.

FIG. 3 is an architecture diagram illustrating a system for decentralized identity management, authentication and authorization of applications, according to one or more embodiments. The system may comprise one or more applications, but not limited to an application App-1 302 and an application App-2 304 communicatively coupled with a data center 306, and a block chain network 308. The data center 306 may in turn comprise one or more authentication servers, but not limited to authentication server-1 310 communicatively coupled to cache 312, authentication server-2 314 communicatively coupled to cache 316 and authentication server-N 318 communicatively coupled to cache 320. The blockchain network 308 may comprise one or more nodes such as, but not limited to node-1 324, node-2, 326, node-3 328 and node-N 330. The blockchain network 308 may be governed by a smart contract 322.

In one or more embodiments, each of the authentication server-1 310, Authentication server-2 314 and Authentication server-N 318 (generally called authentication servers) may comprise Application Program Interface (API) layers. The API layer(s) enable building applications that use the authentication and authorization capabilities developed using the present disclosure.

In one or more embodiments, the App-1 302 may communicate with App-2 304 based on the one or more validations performed at the various stages in blockchain network as discussed in the present disclosure. In one or more embodiments, the App-1 302 and App-2 304 may or may not have a dedicated authentication servers as disclosed in earlier paragraphs. When the App-1 302 and the App-2 304 (generally called applications) doesn't have dedicated authentication servers, the applications may connect to the blockchain network through any of the available authentication servers. One of the application may get the authorization token with at least one of the authorization servers. During the validation of the authorization token, another application may validate the authorization token by at least one of the authorization severs.

Figure 4:
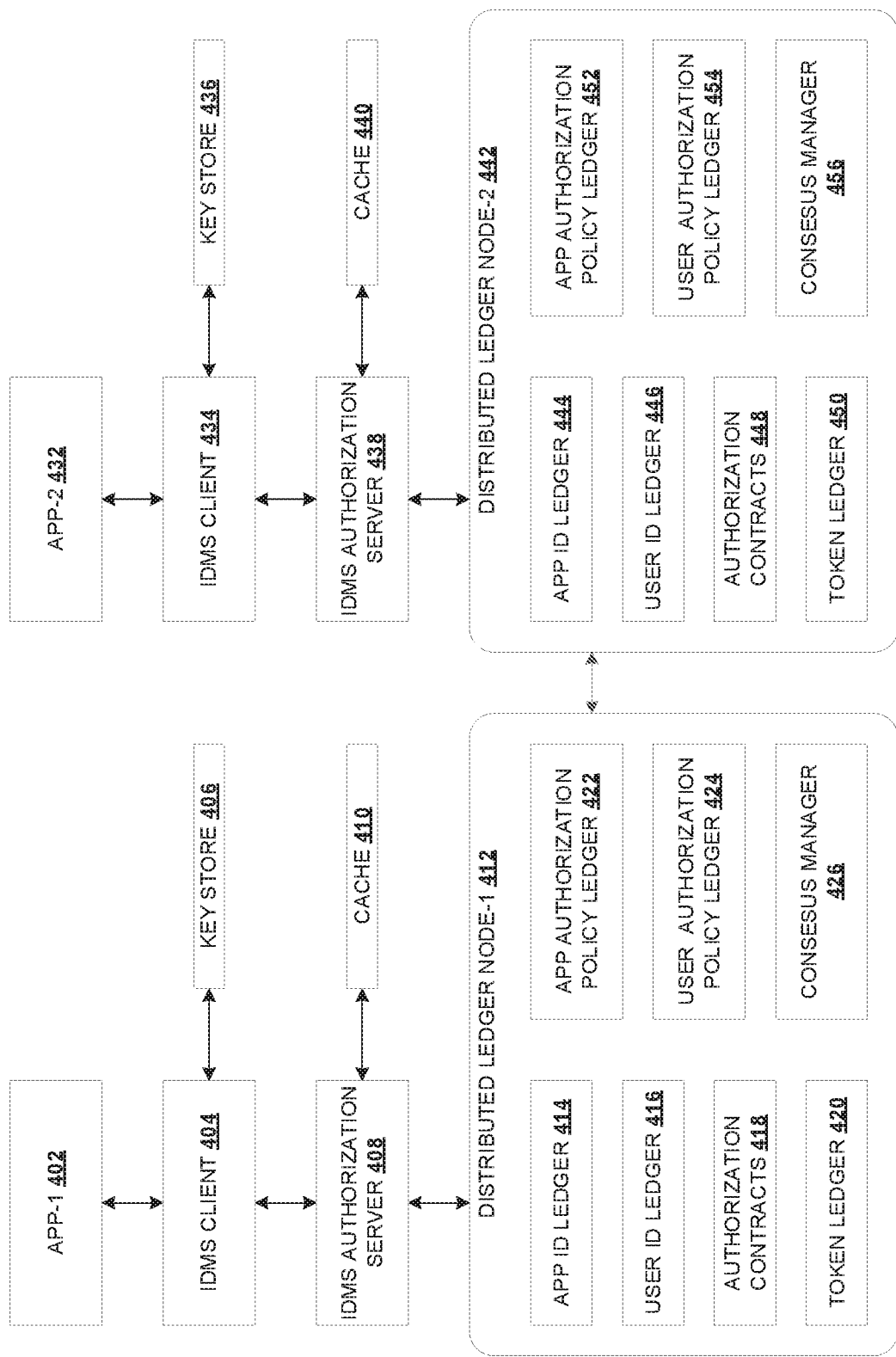
FIG. 4 is an architecture diagram illustrating components of distributed ledger nodes of a system for decentralized identity management, authentication and authorization of applications, according to one or more embodiments.

FIG. 4 is an architecture diagram illustrating components of distributed ledger nodes of a system for decentralized identity management, authentication and authorization of applications, according to one or more embodiments. In one or more embodiments, the system for decentralized identity management, authentication and authorization of application comprises, App-1 402 communicatively coupled with Identity Management System (IDMS) client 404. The IDMS client 404 is communicatively coupled with a key store 406 and IDMS authorization server 408. The IDMS authorization server 408 is communicatively coupled with cache 410 and distributed ledger node-1 412.

The distributed ledger node-1 412 may comprise one or more components, not limited to, App ID ledger 414, user ID ledger 416, authorization contracts 418, token ledger 420, App authorization policy ledger 422, user authorization policy ledger 424, and consensus manager 426.

In one or more embodiments, the system for decentralized identity management, authentication and authorization of application may further comprise, App-2 432 communicatively coupled with Identity Management System (IDMS) client 434. The IDMS client 434 is communicatively coupled with a key store 436 and IDMS authorization server 438. The IDMS authorization server 438 is communicatively coupled with cache 440 and distributed ledger node-2 442.

The distributed ledger node-2 442 may comprise one or more components, not limited to, App ID ledger 444, user ID ledger 446, authorization contracts 448, token ledger 450, App authorization policy ledger 452, user authorization policy ledger 454, and consensus manager 456.

In one or more embodiments, the App-1 402 and/or the App-2 432 may be at least one of, but not limited to, an application installed on an IoT device, an enterprise application, and/or a business service. The App-1 402 may be configured to communicate with the App-2 432. Both the App-1 402 and the App-2 432 (may also be referred as 'Apps' or 'App' or 'application') may be identified with an identifier (ID).

In one or more embodiments, the IDMS client 404 and the IDMS client 434 may be a client component of the system which encapsulates one or more interactions of one or more components of the system. The IDMS client 404 and the IDMS client 434 (also referred as client(s)) may be at least one of, but not limited to, an IoT device, or a library implementation in object oriented programming language, such as, but not limited Java, Python, .NET and/or NodeJS. The IDMS client 404 and the IDMS client 434 may generate a unique ID for App-1 402 and the App-2 432 by hashing one or more binary files of the App-1 402 and the App-2 432, which ensures that the combination of unique ID and the App is tamper proof and can be validated easily. The unique ID may be then associated with public-private key pair of the App so that any request from the App can be signed with the secret private key and the receivers may then authenticate the requests using the public key of the App. The key store 406 may be communicatively coupled with the IDMS client 404 and the key store 436 may be communicatively coupled with IDMS client 434 respectively. The key stores 406, 436 may be configured to store the public-private key pair and the unique ID generated for each App.

In one or more embodiments, the IDMS authorization server 408 and the IDMS authorization server 438 may be a server side component which encapsulates interactions with the distributed ledger components. The IDMS authorization server 408 and the IDMS authorization server 438 may be associated with cache 410 and cache 440 respectively. The cache 410 and the cache 440 may be a temporary storage device configured to store the data stored in one or more registries in the distributed ledger node-1 412 and the distributed ledger node-2 442.

In one or more embodiments, the distributed ledger node-1 412 and distributed ledger node-2 442 (also referred generally as node/nodes) may be a node(s) connected in a blockchain network. It may be connected to each other as illustrated in FIG. 5A. As described in earlier paragraphs, the distributed ledger node-1 412 and distributed ledger node-2 442 may comprise one or more components.

In one or more embodiments, the App ID ledger 414 and the App ID ledger 444, also referred as App ID certificate ledger may be configured to store and maintain a registry of the unique IDs and/or the public key certificates of Apps. Each of the nodes of the system will have a copy of the ledger. The user ID ledger 416 and the user ID ledger 446 may be configured to store IDs of user associated with the Apps. The authorization contracts 418 and the authorization contracts 448 are the smart contracts stored in the nodes. The token ledger 420 and the token ledger 450 may be configured to store token data and any other information of the one or more authorization token related to authorization requests, such as, but not limited to, time when the authorization was token issued, where the authorization token has been transferred and/or which App has used it. The App authorization policy ledger 422 and the App authorization policy ledger 452 may be configured to store one or more App authorization policies created by the Apps. The App authorization policy ledger 422 and the App authorization policy ledger 452 may maintain a distributed registry of authorization policies, governing App to App communications. The App authorization policy ledger 422 and App authorization policy ledger 452 may store details of the authorization permissions granted for App to App communication. The user authorization policy ledger 424 and the user authorization policy ledger 454 may be configured to store one or more user authorization policies. The user authorization policy ledger 424 and the user authorization policy ledger 454 may comprise a user controlled distributed ledger that contains authorization permissions granted by the user to the Apps to access the user data. The user granted authorization permissions contain information on what user specific information can be shared between Apps. The consensus manager 426 and the consensus manager 456 may be configured to manage the communication between the various nodes of the blockchain network and the consensus mechanism for entries to be made in the distributed ledger nodes. The consensus manager 426 and the consensus manager 456 may use gossip protocol to achieve consensus.

Figure 4A:
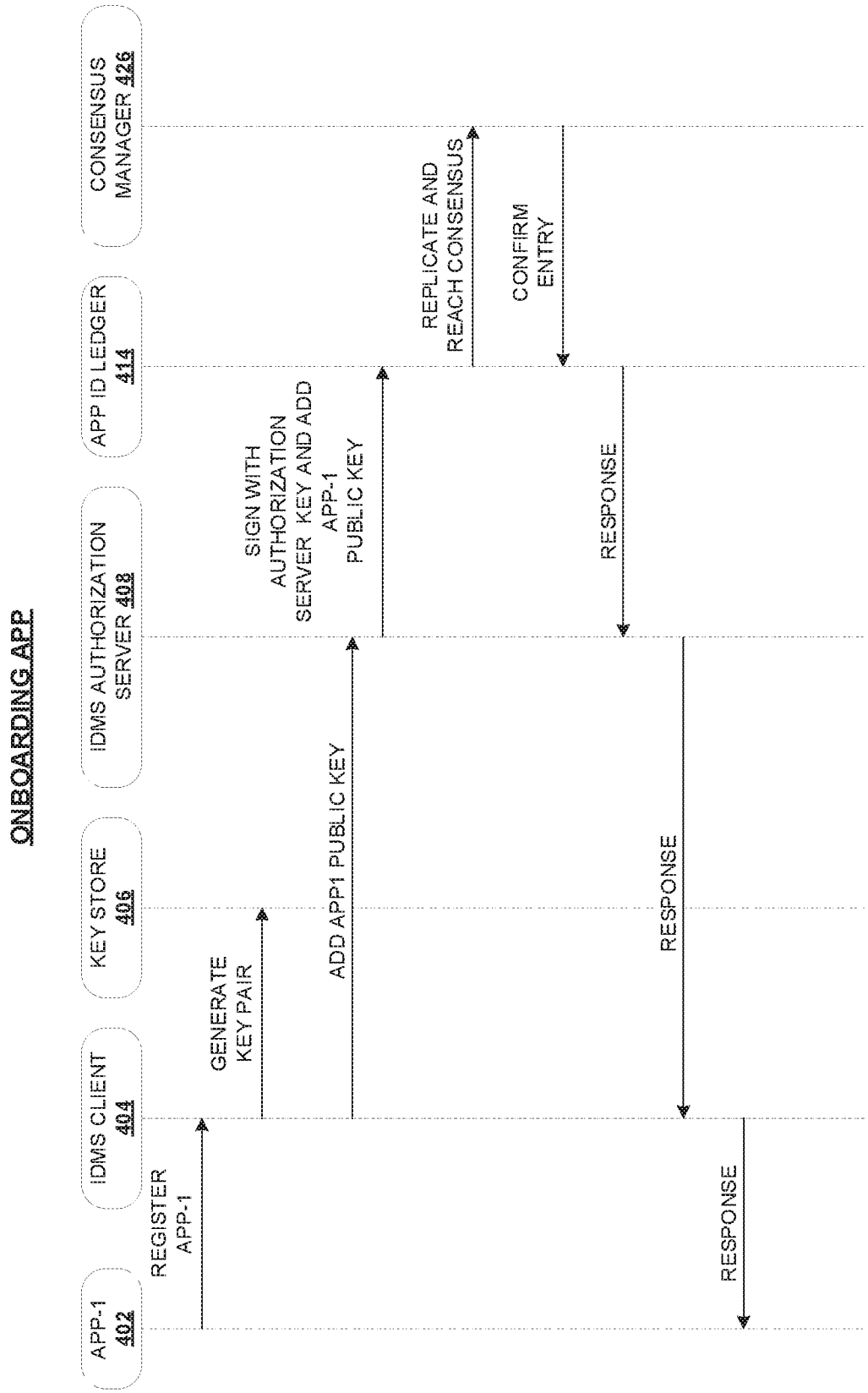
FIG. 4A is a sequence diagram illustrating steps for onboarding an application, according to one or more embodiments.

In one or more embodiments, the system may be configured to onboard one or more application onto a blockchain network, also referred as registration of the application. FIG. 4A is sequence diagram illustrating steps for onboarding an application, according to one or more embodiments. In one or more embodiments, the App-1 402 may initiate process of registration by sending a request to IDMS client 404. The IDMS client 404, in response to the request may generate a public-private key pair using at least one of, but not limited to RSA (Rivest-Shamir-Adleman) algorithm, DSA (Digital Signature Algorithm), ECDSA (Elliptical Curve Digital Signature Algorithm), EdDSA (Edwards-curve Digital Signature Algorithm) and/or Ed25519 algorithm. The IDMS client 404 may store the generated public-private key pair in the key store 406. Further, the IDMS client 404 may send instructions to the IDMS authorization server 408 to add the public key generated for the App-1 402 in the App ID ledger 414. The IDMS authorization server 408 may further sign public key of the App-1 402 with the key of the IDMS authorization server 408 and may store the signed public key in the App ID ledger 414. The App ID ledger 414 may instruct the consensus manager 426 to reach consensus and replicate the signed public key of the App-1 402 in all the nodes connected in the blockchain network.

In one or more embodiments, the consensus manager 426 of the distributed ledger node-1 412 may publish the public key of the App-1 402 in the blockchain network Any other node which is a part of blockchain network may receive the published public key of the App-1 402 through its consensus manager. In the present embodiment, the distributed ledger node-2 442 may receive the published public key of the App-1 402. If the consensus manager 456 of the distributed node-2 442 determines that the quorum in the smart contact to add the public key of an App is defined to be, but not limited to 50 percent, then the public key published by the consensus manager 426 may comply with the required 50 percent quorum, then the distributed ledger node-2 442 which is also part of the blockchain network may store the public key of the App-1 402 in its App ID ledger 444. After reaching consensus and the public key of the App-1 402 is stored in all the nodes connected over the blockchain network, the consensus manager 426 may confirm the entry to the App ID ledger 414. The App ID ledger 414 may in turn send response to IDMS authorization server 408 which in turn may send response to the IDMS client 404 indicating that the App-1 402 has been registered. The IDMS client 404 may send response to the App-1 402 indicating the successful registration of the App-1 402. In addition to the quorum, the consensus manager 456 may also verify the signature of the authorization server in the public key. In the present embodiment, the consensus manager 456 may verify the signature of the IDMS authorization server 408 in the public key of the App-1 402. Whenever there is a request to an App from another App, the above mechanism ensures that the App may obtain the public key of another App from its own node. The signature of the authorization servers may ensure additional layer of security.

In one or more embodiments, the App-2 432 may also register itself in the blockchain network, similar to App-1 402. The App-2 432 may initiate process of registration by sending a request to IDMS client 434. The IDMS client 434, in response to the request may generate a public-private key pair using at least one of, but not limited to RSA (Rivest-Shamir-Adleman) algorithm, DSA (Digital Signature Algorithm), ECDSA (Elliptical Curve Digital Signature Algorithm), EdDSA (Edwards-curve Digital Signature Algorithm) and/or Ed25519 algorithm. The IDMS client 434 may store the generated public-private key pair in the key store 436. Further, the IDMS client 434 may send instructions to the IDMS authorization server 438 to add the public key generated for the App-2 432 in the App ID ledger 444. The IDMS authorization server 438 may further sign public key of the App-2 432 with the key of the IDMS authorization server 438 and may store the signed public key in the App ID ledger 444. The App ID ledger 444 may instruct the consensus manager 456 to reach consensus and replicate the signed public key of the App-2 432 among all the nodes connected in the blockchain network.

In one or more embodiments, the consensus manager 456 of the distributed ledger node-2 442 may publish the public key of the App-2 432 in the blockchain network. Any other node which is a part of blockchain network may receive the published public key of the App-2 432 through its consensus manager. In the present embodiment, the distributed ledger node-1 412 may receive the published public key of the App-2 432. If the consensus manager 426 of the distributed node-1 412 determines that the quorum in the smart contact to add the public key of an App is defined to be, but not limited to 50 percent, then the public key published by the consensus manager 456 may comply with the required 50 percent quorum, then the distributed ledger node-1 412 which is also part of the blockchain network may store the public key of the App-2 432 in its App ID ledger 414. After reaching consensus and the public key of the App-2 432 is stored in all the nodes connected over the blockchain network, the consensus manager 456 may confirm the entry to the App ID ledger 444, The App ID ledger 444 may in turn send response to IDMS authorization server 438 which in turn may send response to the IDMS client 434 indicating that the App-2 432 has been registered. The IDMS client 434 may send response to the App-2 432 indicating the successful registration of the App-2 432. In addition to the quorum, the consensus manager 426 may also verify the signature of the authorization server in the public key. In the present embodiment, the consensus manager 426 may verify the signature of the IDMS authorization server 438 in the public key of the App-2 432.

Figure 4B:
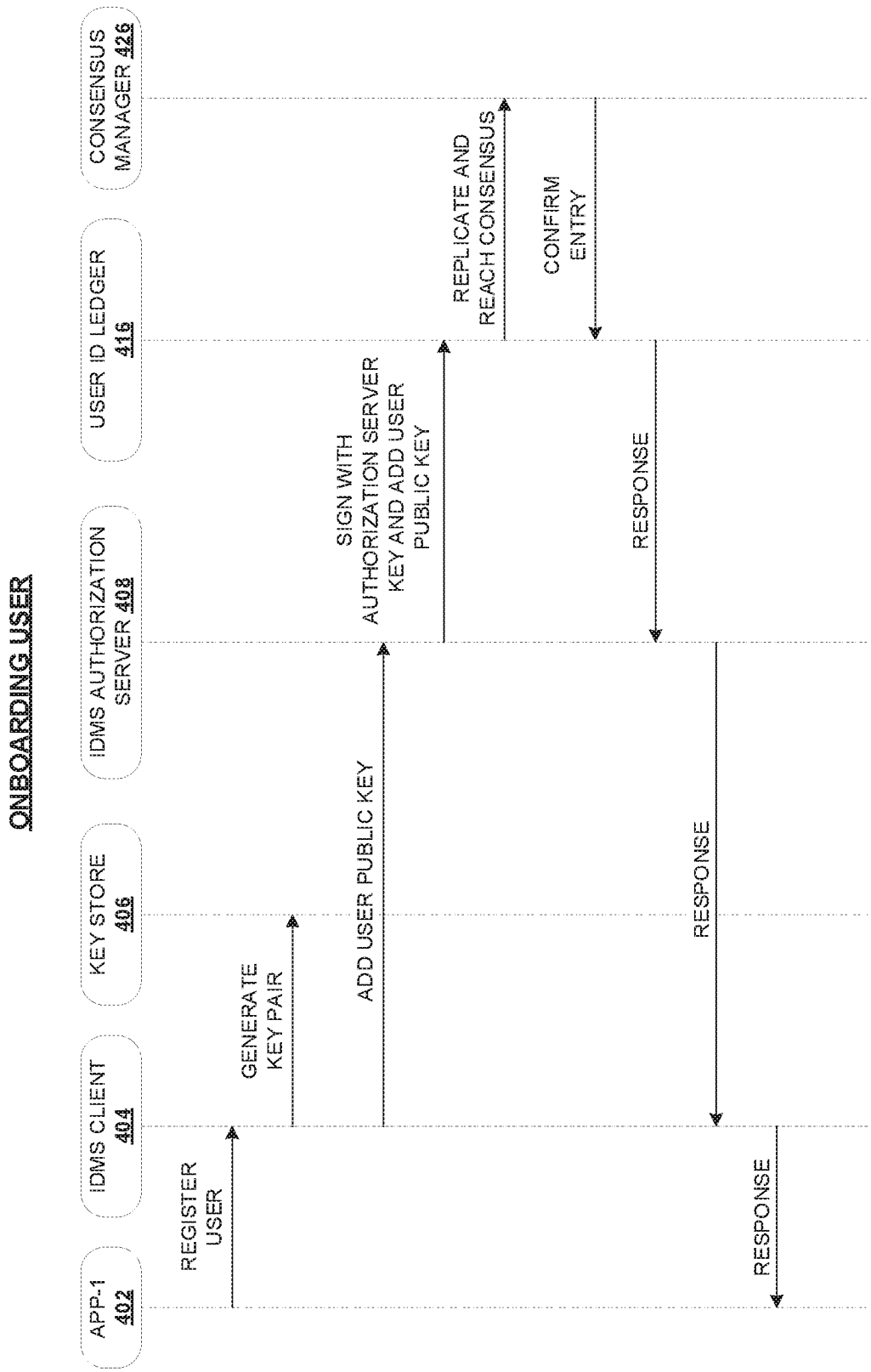
FIG. 4B is a sequence diagram illustrating steps for onboarding a user, according to one or more embodiments.

FIG. 4B is a sequence diagram illustrating steps for onboarding a user, according to one or more embodiments. The user may be logged in using either of the App-1 402 or App-2 432. In an example embodiment, the steps for onboarding a user, also referred as user registration is described with respect to App-1 402. The similar steps are applicable to App-2 432 and the respective components of distributed ledger node-2 442. Considering a case that user is logged in through App-1 402, the App-1 402 may send a request to the IDMS client 404, wherein the IDMS client 404 may generate a public-private key pair, by using at least one of, but not limited to RSA (Rivest-Shamir-Adleman) algorithm, DSA (Digital Signature Algorithm), ECDSA (Elliptical Curve Digital Signature Algorithm), EdDSA (Edwards-curve Digital Signature Algorithm) and/or Ed25519 algorithm. The IDMS client 404 may the store the generated public-private key pair in the key store 406. Also, the IDMS client 404 may instruct the IDMS authorization server 408 to publish the public key of the user in a blockchain network. The IDMS authorization server 408 may then sign the public key of the user with its private key and may store the signed public key in user ID ledger 416. The user ID ledger may instruct the consensus manager 426 to publish the user ID. The consensus manager may then broadcast the user public key in the blockchain network, wherein the public key of the user is replicated in all the nodes connected over the blockchain network. When the consensus is reached based on the smart contract, all the nodes connected over the blockchain network may store the user public key in their user ID ledger. In the present embodiment, distributed ledger node-2 442 may store the public key of the user in the user ID ledger 446. Similarly, a user may also be on-boarded through App-2 432.

Figure 4C:
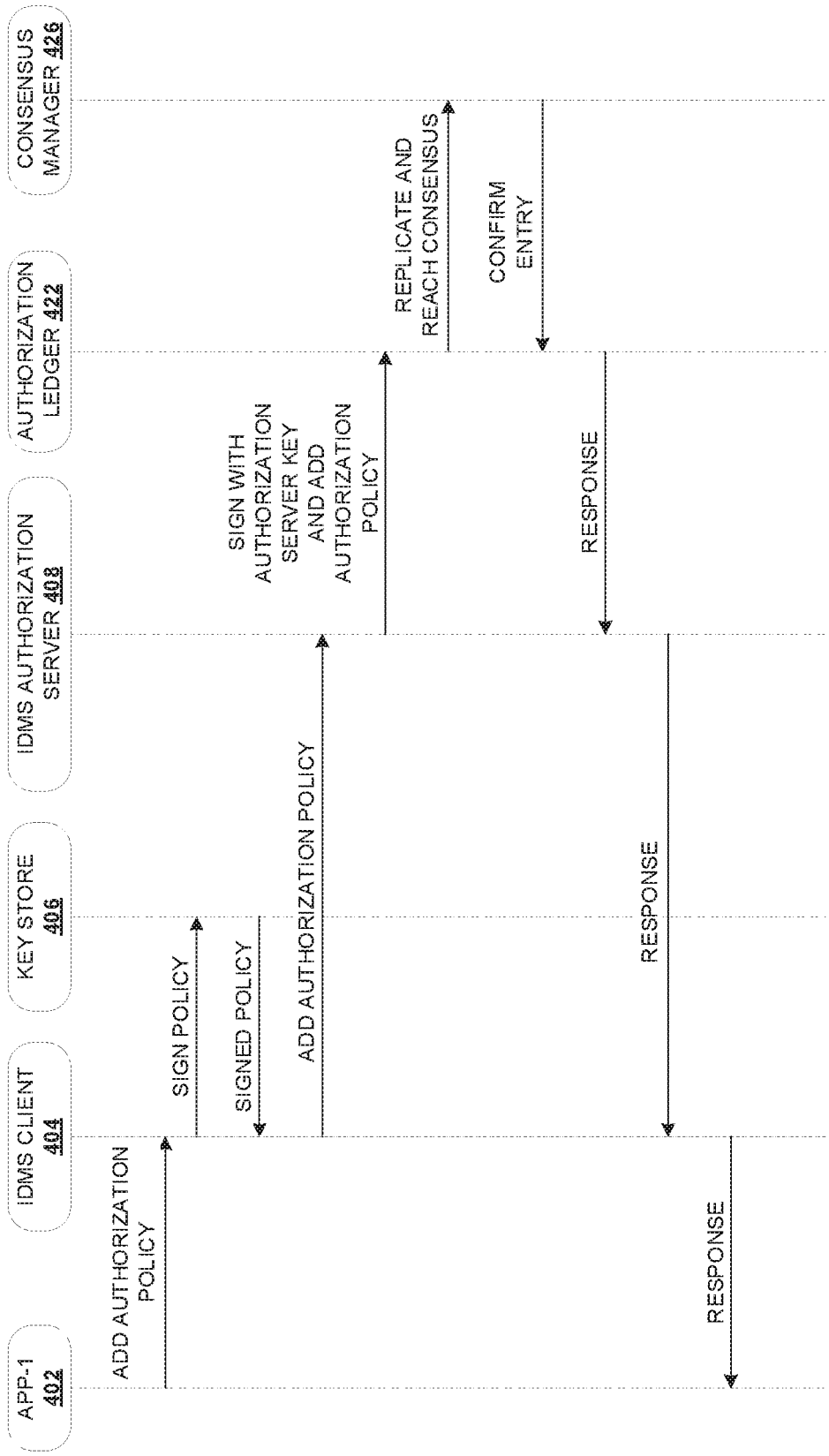
FIG. 4C is a sequence diagram illustrating steps for defining authorization policies for applications, according to one or more embodiments.

FIG. 4C is a sequence diagram illustrating steps for defining authorization policies for applications, according to one or more embodiments. In one or more embodiments, the App-1 402 may create one or more authorization policies, also referred as authorization permissions. The authorization permissions created by an application may be one or more rules which allows the communication with other application. For example, a first application may create an authorization permission that it is allowed to communicate with a second application, then the rules may define that first application is permitted to communicate with second application, which is checked by one or more components associated with the first application before it communicates with the second application. Say in an enterprise environment, there is a general summary application which gives an overview of the multiple details associated with an employee, and there is a leave application which separately manages the leave details of the employee. The authorization permission may be of two folds, firstly, whether the general summary application is allowed to fetch data from the leave application and secondly, whether the general summary application is allowed to access the data of a particular employee from the leave application. In the second case, the employee may or may not have provided the permission to the general summary application to access leave data from the leave application. In an enterprise environment, the admin may set the permission for each of the applications, called App authorization permissions and may allow employee to set his/her own permission to access the data, called user authorization permissions. The App authorization permission may be stored in distributed ledger node as illustrated in FIG. 4C.

In one or more embodiments, the admin may create one or more App authorization permissions, say App-1 402 is allowed to communicate with App-2 432. The one or more App authorization permissions created by the admin for the App-1 402 may be communicated to the IDMS client 404. The IDMS client 404 may sign the one or more App authorization permission with the private key of the App-1 402 by accessing the private key from the key store 406 which was stored during the App registration. The IDMS client 404 may then send the one or more App authorization permissions to the IDMS authorization server 408. The IDMS authorization server 408 may then sign the one or more App authorization policies with its key and then may send it to App authorization policy ledger 422 which in turn may cause the consensus manager 426 replicate the one or more App authorization policies in one or more nodes connected over a blockchain network. The consensus may be achieved based on smart contract, and a copy of one or more authorization permission may be stored in registries of one or more distributed ledger nodes. The consensus manager may send a response to the App authorization policy ledger 422 on successful entry in the registries of the one or more distributed ledger nodes, which in turn may send response to the IDMS authorization server 408. The IDMS authorization server 408 may send the response to the IDMS client 404 which may in turn send response to the App-1 402.

In one or more embodiments, the admin may sign the one or more App authorization permission while creating, which is further signed by, App-1 402, the IDMS client 404 and/or the IDMS authorization server 408 to ensure additional security so that the data can be extracted only if public keys of admin, App-1 402, IDMS client 404 and IDMS authorization sever 408 are available, so that no intruder can tamper the data and will be accessible only if the applications have access to the public keys of all the entities which signs the one or more App authorization permissions/data.

In one or more embodiments, the admin may login to more than one of the one or more applications to make the system work based on quorum required for consensus mechanism to work. For example, if there are four applications in the blockchain network of four nodes, and smart contract is written in such a way that the quorum required for App authorization permission is 75 percent, meaning, the same authorization permission is to be entered/published by at least three of the four applications, the admin may login to at least three of the four applications and make an entry so that consensus is achieved for the entry to be made in the registries of the four nodes in the blockchain network.

In one or more embodiments, in a manner similar to App authorization permission, user authorization permissions may also be stored in user authorization policy ledger (424, 454) in the distributed ledger node through at least one of the App-1 402 or App-2 432.

Figure 4D:
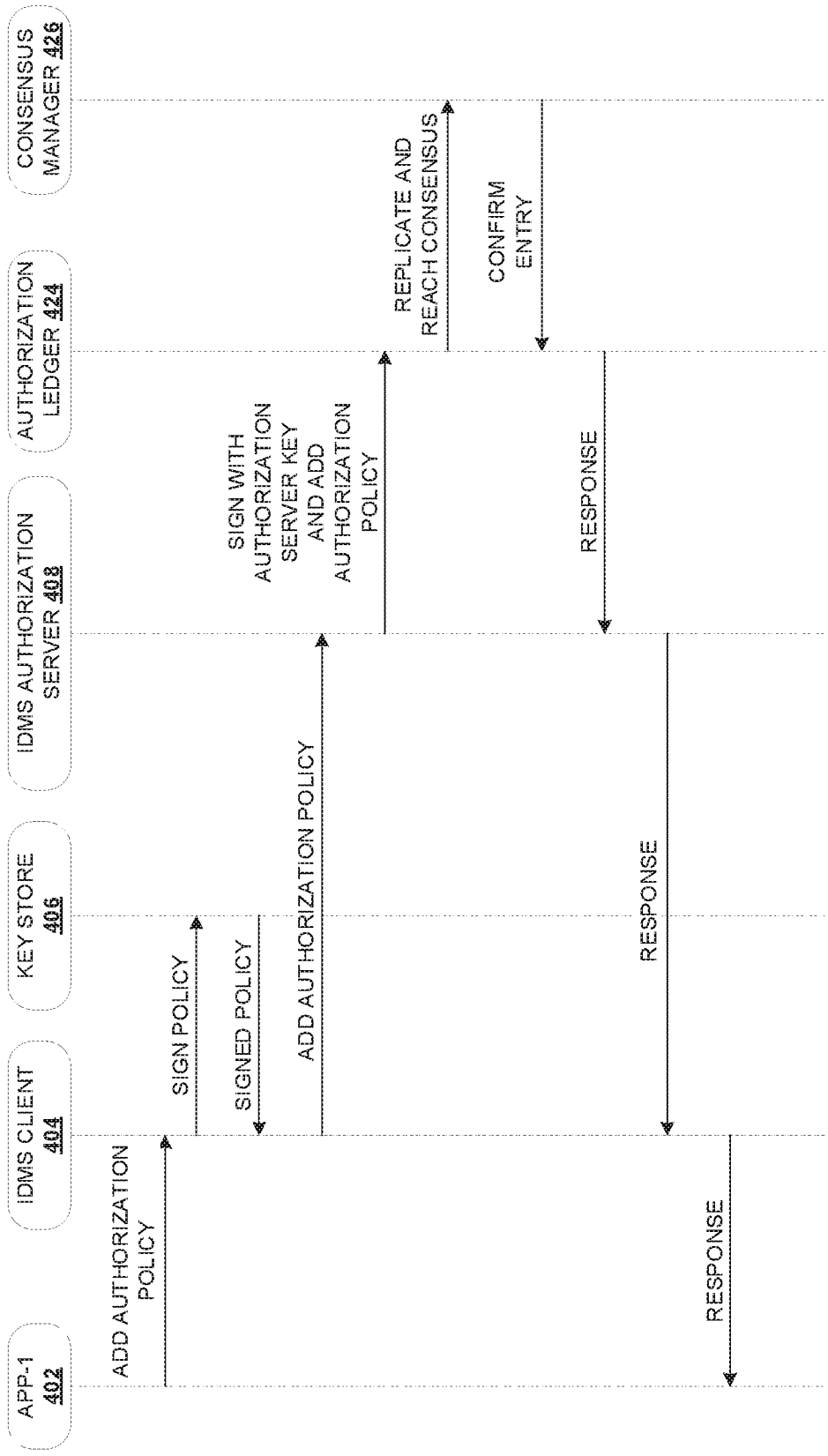
FIG. 4D is a sequence diagram illustrating steps for defining authorization policies for users, according to one or more embodiments.

FIG. 4D is a sequence diagram illustrating steps for defining authorization policies for users, according to one or more embodiments. In one or more embodiments, the user may be logged in to App-1 402 and create one or more user authorization policies, also referred as user authorization permissions. The user authorization permissions created by the user may be one or more rules which allows one or more applications to access user data. For example, the user may create an authorization permission such as, but not limited to, first application is authorized to access user data, the first application is authorized to receive the user data from the second application, and/or the second application is authorized to access the user data and so on. The one or more user authorization permissions are checked by one or more components associated with the first application before it communicates with the second application. Say in an enterprise environment, there is a general summary application which gives an overview of the multiple details associated with an employee, and there is a leave application which separately manages the leave details of the user. The authorization permission may be of two folds, firstly, whether the general summary application is allowed to fetch data from the leave application and secondly, whether the general summary application is allowed to access the data of a particular user from the leave application. In the second case, the user ma provided the permission to the general summary application to access leave data of the user from the leave application. In an enterprise environment, the admin may set the permission for user or may allow user to set his/her own permissions to access the data.

In one or more embodiments, the user may create one or more user authorization permissions, say the App-1 402 is allowed receive user data from the App-2 432. The one or more user authorization permissions created by the user for the App-1 402 may be communicated to the IDMS client 404. The IDMS client 404 may sign the one or more user authorization permissions with the private key of the user by accessing the private key from the key store 406 which was stored during the user registration or user onboarding as described in FIG. 4B. The IDMS client 404 may then send the one or more user authorization permissions to the IDMS authorization server 408. The IDMS authorization server 408 may then sign the one or more user authorization permissions with its key and may send it to user authorization policy ledger 424 which in turn may cause the consensus manager 426 replicate the one or more user authorization policies in one or more nodes connected over a blockchain network. The consensus may be achieved based on smart contract, and a copy of one or more authorization permission may be stored in registries of one or more distributed ledger nodes. The consensus manager may send a response to the user authorization policy ledger 424 on successful entry in the registries of the one or more distributed ledger nodes, which in turn may send response to the IDMS authorization server 408. The IDMS authorization server 408 may send the response to the IDMS client 404 which may in turn send response to the App-1 402.

In one or more embodiments, the admin may sign the one or more user authorization permission while creating, which is further signed by, App-1 402, the IDMS client 404 and/or the IDMS authorization server 408 to ensure additional security so that the data can be extracted only if public keys of admin, App-1 402, IDMS client 404 and IDMS authorization sever 408 are available, so that no intruder can tamper the data and will be accessible only if the applications have access to the public keys of all the entities which signs the one or more user authorization permissions/data.

Figure 4E:
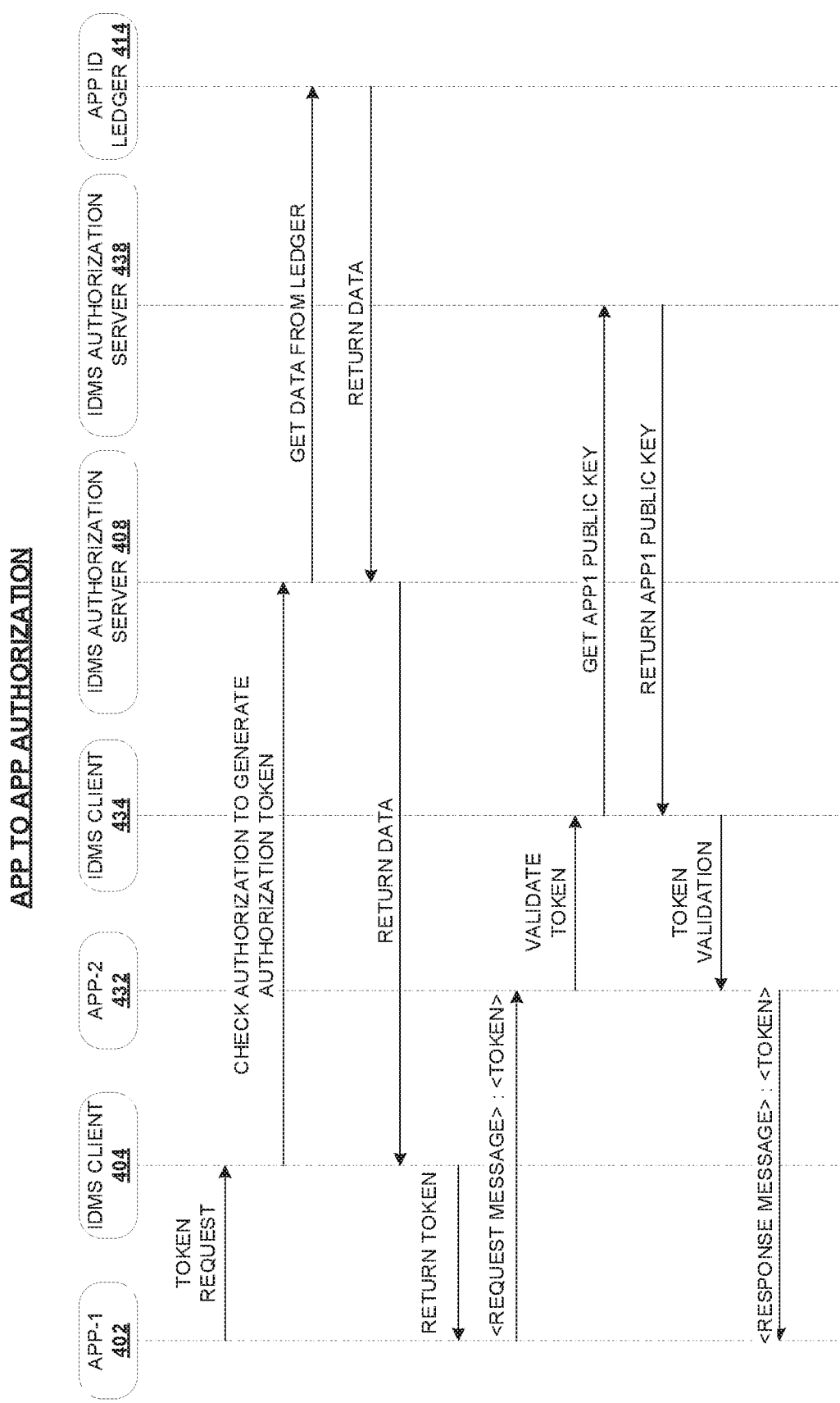
FIG. 4E is a sequence diagram illustrating steps for authorizing a request, according to one or more embodiments.

FIG. 4E is a sequence diagram illustrating steps for authorizing a request, according to one or more embodiments. In one or more embodiments, the App-1 402 may want to communicate with App-2 432. The App-1 402, in order communicate with App-2 432, may send a request for authorization token to IDMS client 404. The IDMS client 404 may send a request to the IDMS authorization server 408 to check whether App-1 402 is authorized to communicate with App-2 432. Based on the request from the IDMS client 404, the IDMS authorization server 408 may get data from the distributed ledger node-1 412.

In one or more embodiments, the data may be at least one of public key of the App-1 402 extracted from the App ID ledger 414, one or more App authorization permissions from App authorization policy ledger 422 and/or one or more user authorization permissions from user authorization policy ledger 424. The IDMS authorization server 408 may determine, at least one of, whether the public key of the App-1 402 is present in the App ID ledger 414 and/or whether at least one of the one or more App authorization permission allows the App-1 402 to communicate with 402. The IDMS authorization server 408 may also determine, as another layer of authorization that whether App-1 402 is further authorized to access specific user's data from the App-2 432. If at least one of the one or more App authorization permissions of the App-1 402 in relation to App-2 432 is a grant permission, then the IDMS authorization server 408 may send a response indicating that the App-1 402 is authorized to communicate with App-2 432.

If the response from the IDMS authorization server 408 indicates that the communication between App-1 402 and App-2 432 is allowed, i.e., the App-1 402 is authorized to communicate with the App-2 432 then the IDMS client 404 may generate an authorization token. The authorization token may comprise token data, not limited to, a nonce, a token expiry time and a usage flag. In cryptography, a nonce is an arbitrary number that can be used just once, which may help to avoid replay attacks. The usage flag indicates if a request with the given token is already received in which case no subsequent request can use the same token. This may prevent replay attacks wherein someone eavesdrops and uses the tokens repeatedly. The IDMS client 404 may sign the authorization token with the private key of the App-1 402 and may send it to the App-1 402. Further, the IDMS client 404 may store the generated authorization token in the token ledger 420 in the distributed ledger node-1 412. Based on the consensus algorithm written in the smart contract, the authorization token may be replicated in all the nodes connected over the blockchain network, so that any node can access the authorization token during validation. The App-1 402, on receiving the authorization token from the IDMS client 404, may send request appended with the authorization token to the App-2 432 using at least one of the communication protocol, but not limited to, Hyper Text Transfer Protocol (HTTP), Remote Procedure Call (RPC), Representational State Transfer (REST), and/or Simple Object Access Protocol (SOAP).

In one or more embodiments, the App-2 432 may receive request along with the authorization token from the App-1 402. The App-2 432 may validate the authorization token using IDMS client 434. The IDMS client 434 may retrieve the public key of the App-1 402 from the App ID ledger 444 of the distributed ledger node-2 442 through IDMS authorization server 438. The authorization server 438 may return the public key of the App-1 402 and any other data requested by the IDMS client 434 for the validation of the authorization token. In one or more embodiment, the IDMS client 434 may request user ID if either of the request or the authorization token in signed with user ID. The IDMS client 434 may also request public key of the authorization server 408 if the authorization token is signed with private key of the authorization server 408. In one or more embodiments, the validation of token may include at least one of, but not limited to, verification of public key of App-1 402 and/or authorization server 408, determining the expiry time of token and status of usage flag. In one or more embodiments, only if the authorization token is flagged for one time usage of App-2 432, the IDMS client 434 may then validate the authorization token my accessing one or more data from the token ledger 450 and may further update the authorization token with usage details of App-2 432.

In one or more embodiments, if the IDMS client 434 determines that the authorization token is indeed signed with public key of App-2 402, and the token expiry time and usage flag is valid, the instructions may be sent to the App-2 432 indicating the authorization token is valid. Based on the instructions from the IDMS client, if the authorization token is valid, the App-2 432 may send the requested data to the App-1, 402. If the authorization token is determined to be invalid, then the App-2 432 may reject the request of the App-1 402.

FIG. 5A, illustrates consensus mechanism between two or more nodes in a blockchain network, according to one or more embodiments. In an example embodiment, consider that the distributed ledger node-1 412 is node-1 502, and the distributed ledger node-2 442 is node-2 504 and there is another node, node-3 506, wherein all nodes are connected over the blockchain network. App-1 may be connected to node-1 502 through authorization server-1, and App-2 may be connected to node-2 504 through authorization server-2. There may be another application App-3 connected to node-3 506 through a dedicated authorization server (not shown in the Figure). A consensus algorithm defined in the smart contract may govern how data is stored and/or entries are made in registries of each node connected over a block chain network.

A consensus algorithm may be a process used to achieve agreement on a single data value among distributed processes or systems. The distributed ledger commonly referred as Blockchain also relies on consensus algorithm to reach agreement among nodes. A smart contract is a computer protocol intended to facilitate, verify, or enforce the negotiation or performance of a contract.

In a regular blockchain network, entry at one node may replicate the entry in all nodes. It may not be suitable in enterprise scenario or an IoT environment, wherein if one device could be hacked, the security of the whole network will be at stake, since data can be modified easily similar to regular blockchain network. The present disclosure overcomes this problem, by making sure that the data entry into the blockchain network is from considerable number of nodes, or all nodes based on smart contract.

Consider there is a need to add an App authorization permission that App-1 is allowed to communicate with App-2. The traditional blockchain is designed in such a way that an entry can be made and not able to delete it. For example, in Bitcoin or Ethereum, one may go to one node and add one block (transaction) and block is sent to all other nodes in the network. The block may get replicated to all of the nodes and all the nodes indicate that copy of the block has been received and further indicate that all the nodes have added the entry. Other nodes doesn't reject it unless it is double spent. The consensus rules may define that if a node owns currency, the same node is are allowed to transfer it.

In the example embodiment, if the blockchain is used as is, an entry in node-1 502 will make entry in other nodes like node-2 504 and node-3 506. But if hacker is able to hack at least one of the nodes, they data security is at stake. The present disclosure overcomes this problem by making the network more secure.

In one or more embodiments, the system may have the consensus algorithm in such a way that same data needs to be entered by all nodes. When the entry from all nodes are same, only then the entry of one node may be replicated in other nodes. In one of the implementations, till the time all the nodes send the same entry, the data may be entered in temporary ledger and may be moved to permanent ledger once the data entry meets consensus algorithm. In an enterprise environment, the admin would have the record of private keys of all the nodes, then the admin might log in to all the nodes and make an entry so that the data from all the nodes are same and consensus is reached.

In one or more embodiments, along with the mandate of data entry from all nodes, the smart contract may also look for signature of private key of all participants in the blockchain network. For example, apps, clients, servers, users and admin are the participants in the network. The system may mandate signatures of all the participants. If an App is making an entry in the distributed ledger, the App may sign the data with its private key, client may sign the data with its private key, servers may sign the data with its private key and/or user/admin may sign the data with their private keys. The smart contract may look for presence of all the private keys for an entry to be replicated in all the nodes of the blockchain network. It may not be easy for any hackers to get the private key of all the participants to make at least one entry in the node, hence hacking becomes nearly impossible.

FIG. 5B, illustrates a permissions request ledger, which comprises list of authorization permissions that are requested by one or more applications, according to one or more embodiments. FIG. 5C, illustrates approved permissions ledger which comprises list of approved authorization permissions, according to one or more embodiments. The permission requested by the one or more application may be approved based on consensus algorithm present in a smart contract.

In one or more embodiments, a computer implemented method, system, and/or a non-transitory computer readable storage medium for decentralized identity management, authentication and authorization of applications. The system may include one or more participants, but not limited to applications (Apps), clients, authorization servers, and distributed ledger nodes, wherein each of the distributed ledger nodes are communicatively coupled over a blockchain network. For example, a first app may be connected to a first client, which in turn is connected to first authorization server. The first authorization sever may be connected to first node of blockchain network. Similarly, a second app may be connected to a second client, which is in turn connected to second authorization sever The second authorization server may be connected to a second node of blockchain network.

In one or more embodiments, the first app and the second app may be identified with their public-private key pairs, wherein the key pairs are generated by the first client and the second client. Further the first client and the second client may have their own public-private key pairs. The first authorization server and the second authorization server may also have their public-private key pairs. Each of the first app and the second app, first client and the second client, the first authorization server and the second authorization server may store their public keys in their respective nodes. The first app and the second app may define one or more App authorization permissions and may be stored in their respective nodes based on the consensus algorithm present in the smart contract of the blockchain network. One or more user authorization permission associated with the users of the first app and the second app may also be stored in the nodes.

For example, the first app may be a dashboard app and the second app may be a leave app in an enterprise environment. The dashboard app may present consolidated data of a user from all other apps like leave, travel, salary, and so on. The leave app may store only leave details of the user. One or more users may be at least one of employee(s) and/or admin. The admin may define that dashboard app may access data from leave app. The admin may also provide facility to one or more users to define user data access permissions. The admin may define which apps to be communicated with each other and users may define what data need to be shared between applications. When the admin defines that dashboard app may access data from leave app, the admin may enter these App authorization permissions by logging into at least one of the apps or all the apps/nodes in the network.

In one or more embodiments, the admin may log in to dashboard app and may define an App authorization permission that dashboard app may communicate with leave app. The first client may sign the App authorization permission from the dashboard app using private key of the dashboard app and may store it in the first node. Now, the data may be stored in a temporary ledger of the first node. The first node may broadcast to other nodes that there is an entry in the node. Next, the admin may log in to the leave app and may define an App authorization permission that leave app may allow communication from the dashboard app or dashboard app may communicate with leave app. The app authorization permission entered from the leave app is further signed by the second client using the private key of the leave app and is stored in temporary ledger of the second node. The second node may further broadcast to other nodes that there is an entry from the node.

In both the case, since the App authorization permissions are same and is from two different nodes, the app authorization permissions are stored in the permanent ledger of both the nodes, based on the consensus algorithm present the in the smart contract. In this case, the smart contract may contain that—data need to be replicated to all nodes only if the entry is from all the nodes. In one or more embodiments, if the App authorization permission is signed by admin private key, the nodes may directly store the App authorization permissions in their permanent ledgers. In this case, the smart contract may contain that if the App authorization permissions are signed by the admin, all the nodes may store the App authorization permissions in their permanent ledger. Similarly, the user may also store User authorization permission in the nodes.

In one or more embodiments, the dashboard app may send request to the first client that it needs to communicate with leave app and hence requests a token. The first client may communicate with first authorization server to determine whether the dashboard app is authorized to communicate with leave app. The first authorization server may access the first node to determine whether at least one of the one or more authorization permissions is a grant permission. The first authorization server may then communicate to the first client that dashboard app is allowed to communicate with leave app. The first client may then generated authorization token indicating that the communication is permitted. The first client may not generated the authorization token if the App authorization permissions doesn't allow communication or if there are no app authorization permissions for the communication between dashboard app and the leave app. The generated authorization token may be stored in the first node and may be replicated to all nodes based on consensus algorithm present in the smart contract.

In one or more embodiments, the authorization token may comprise data, at least one of, but not limited to a nonce, a token expiry time and/or a usage flag. The first client may sign the authorization token with the private key of the dashboard app and may send it to the dashboard app. Now, the dashboard app may send the request to the leave app, appending the request with the authorization token. The leave app, after the receiving the request from the dashboard app, the second client may first validate the identity of the dashboard app by accessing the public key from the second node through second authorization server. After the app identity is validated, the second client may determine the validity of the authorization token by verifying the data of the authorization token by accessing it from the second node through second authorization server. After validating the authorization token, the leave application may send the required data to the dashboard application.

In one or more embodiments, the leave application may not determine whether the dashboard application is authorized to access data from the leave app, since the check is already performed by the first application, saving the bandwidth and time in the system of leave application. In one or more embodiments, the first client may also determine whether the dashboard app is authorized to access a user data from the leave app, by checking the User authorization permission at the first node, and may reject the request if the user does not permit the dashboard app to access the leave app.

In one or more embodiments, the solution can be improved with hardware supported key generation algorithms and hardware supported secure key storage solutions.

The method and/or system of the present disclosure enables selective disclosure of information across applications by restricting access to unnecessary data. The method/system also enables building applications that provide ownership of data to the end user thereby empowering them to control how their personal data is used by other applications. The method/system helps build a foundational trust layer by enabling applications interact with each other with requests that are digitally signed through a decentralized public key infrastructure.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-ray™ disc, a floppy disk, or a diskette. A computer program embodying the aspects of the exemplary embodiments may be loaded onto the one or more processors. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A computer implemented method for decentralized authorization of communication between two or more applications, comprising:

storing, by one or more authorization servers, public keys and one or more authorization permissions of a first application and a second application in one or more distributed ledger nodes in a blockchain network;

determining, by the one or more authorization servers, authorization permissions for the first application to communicate with the second application in response to a request from a client associated with the first application, wherein the authorization permissions comprise one or more application authorizations and one or more user authorizations;

providing, by the one or more authorization servers, the determined authorization permissions to the client associated with the first application to initiate generation of an authorization token by the client associated with the first application and transmission of the request to the second application by the first application when validation of the determined authorizations comprises confirmation of a grant permission for the communication;

receiving, by the one or more authorization servers, the authorization token encrypted with a private key by the client associated with the first application when the determined authorizations comprises the grant of the permission for the communication with the second application; and providing, by the one or more authorization servers, in response to a request from the client associated with the second application one of the stored public keys of the first application retrieved from the one or more distributed ledger nodes in the blockchain network to determine validation of the encrypted authorization token to authorize the communication between the first application and the second application.

2. The method of claim 1, further comprising, storing, by the one or more authorization servers, the authorization token in the one or more distributed ledger nodes based on a smart contract.

3. The method of claim 1, wherein the authorization token further comprises token data that comprises at least one of a nonce, a token expiry time or a usage flag.

4. The method of claim 1, wherein the public keys and the one or more authorization permissions are stored in one or more registries in the one or more distributed ledger nodes, based on consensus algorithm present in a smart contract.

5. The method of claim 1, wherein the storing further comprises causing the public keys to be published among the one or more distributed ledger nodes through approval, wherein the approval is provided based on predefined consensus present in a smart contract of the blockchain network.

6. The method of claim 1, wherein the request from the client associated with the first application to communicate with the second application is denied when the authorization token is invalid.

7. The method of claim 1, wherein the request from the first application is to receive data from the second application.

8. The method of claim 1, wherein the one or more authorization permissions further comprise one or more deny permissions.

9. A decentralized authorization system comprising:
   at least one processor; and
   at least one memory unit operatively coupled to the at least one processor and having instructions stored thereon that, when executed by the at least one processor, causes the at least one processor to:
      store public keys and one or more authorization permissions of a first application and a second application in the one or more distributed ledger nodes in the blockchain network;
      determine authorization permissions for the first application to communicate with the second application in response to a request from a client associated with the first application, wherein the authorization permissions comprise one or more application authorizations and one or more user authorizations;
      provide the determined authorization permissions to the client associated with the first application to initiate generation of an authorization token by the client associated with the first application and transmission of the request to the second application by the first application when validation of the determined authorizations comprises confirmation of a grant permission for the communication;
      receive the authorization token encrypted with a private key by the client associated with the first application when the determined authorizations comprises the grant of the permission for the communication with the second application; and
      provide in response to a request from the client associated with the second application one of the stored public keys of the first application retrieved from the one or more distributed ledger nodes in the blockchain network to determine validation of the encrypted authorization token to authorize the communication between the first application and the second application.

10. The system of claim 9, further causes the at least one processor to, store the authorization token in the one or more distributed ledger nodes based on a smart contract.

11. The system of claim 9, wherein the authorization token further comprises token data that comprises at least one of a nonce, a token expiry time or a usage flag.

12. The system of claim 9, wherein the public keys and the one or more authorization permissions are stored in one or more registries of the one or more the distributed ledger nodes, based on consensus algorithm present in a smart contract.

13. The system of claim 9, wherein the store further comprises causing the public keys to be published among the one or more distributed ledger nodes through approval, wherein the approval is provided based on predefined consensus present in a smart contract of the blockchain network.

14. The system of claim 9, wherein the request from the client associated with the first application to communicate with the second application is denied when the authorization token is invalid.

15. The system of claim 9, wherein the request from the first application is to receive data from the second application.

16. The system of claim 9, wherein the one or more authorization permissions further comprise one or more deny permissions.

17. The non-transitory computer readable medium having stored thereon instructions for decentralized authorization of communication between two or more applications, comprising machine executable code which when executed by at least one processor, causes the at least one processor to perform steps comprising:
   storing public keys and one or more authorization permissions of a first application and a second application in one or more distributed ledger nodes in a blockchain network;
   determining authorization permissions for the first application to communicate with the second application in response to a request from a client associated with the first application, wherein the authorization permissions comprise one or more application authorizations and one or more user authorizations;
   providing the determined authorization permissions to the client associated with the first application to initiate generation of an authorization token by the client associated with the first application and transmission of the request to the second application by the first application when validation of the determined authorizations comprises confirmation of a grant permission for the communication;
   receiving the authorization token encrypted with a private key by the client associated with the first application when the determined authorizations comprises the grant of the permission for the communication with the second application; and
   providing in response to a request from the client associated with the second application one of the stored public keys of the first application retrieved from the one or more distributed ledger nodes in the blockchain network to determine validation of the encrypted authorization token to authorize the communication between the first application and the second application.

18. The non-transitory computer readable medium of claim 17, further comprising, storing the authorization token in the one or more distributed ledger nodes based on a smart contract.

19. The non-transitory computer readable medium of claim 17, wherein the authorization token further comprises token data that comprises at least one of a nonce, a token expiry time or a usage flag.

20. The non-transitory computer readable medium of claim 17, wherein the public keys and the one or more authorization permissions are stored in one or more registries in the distributed ledger, based on consensus algorithm present in a smart contract.

21. The non-transitory computer readable medium of claim 17, wherein the store further comprises causing the public keys to be published among the one or more distributed ledger nodes through approval, wherein the approval is provided based on predefined consensus present in a smart contract of the blockchain network.

22. The non-transitory computer readable medium of claim 17, wherein the request from the client associated with the first application to communicate with the second application is denied when the authorization token is invalid.

23. The non-transitory computer readable medium of claim 17, wherein the request from the first application is to receive data from the second application.

24. The non-transitory computer readable medium of claim 17, wherein the one or more authorization permissions further comprise one or more deny permissions.

* * * * *